(12) United States Patent
Liebenow

(10) Patent No.: US 7,418,406 B2
(45) Date of Patent: Aug. 26, 2008

(54) MUSIC DISTRIBUTION APPARATUS AND METHOD

(75) Inventor: Frank Liebenow, Dakota Dunes, SD (US)

(73) Assignee: Gateway Inc., Irvine, CA (US)

( * ) Notice: Subject to any disclaimer, the term of this patent is extended or adjusted under 35 U.S.C. 154(b) by 852 days.

(21) Appl. No.: 10/600,917

(22) Filed: Jun. 20, 2003

(65) Prior Publication Data

US 2005/0021414 A1    Jan. 27, 2005

(51) Int. Cl.
    *G06Q 30/00*    (2006.01)
(52) U.S. Cl. ........................................... 705/26
(58) Field of Classification Search .................. 705/26, 705/27, 51
    See application file for complete search history.

(56) References Cited

U.S. PATENT DOCUMENTS

| 6,460,076 | B1 | 10/2002 | Srinivasan | |
| 2002/0062357 | A1 | 5/2002 | Srinivasan | |
| 2002/0082997 | A1* | 6/2002 | Kobata et al. | 705/51 |
| 2003/0156719 | A1* | 8/2003 | Cronce | 380/256 |

FOREIGN PATENT DOCUMENTS

| JP | 2003066972 A | * | 3/2003 |
| WO | WO 01/29732 A2 | | 4/2001 |
| WO | WO 01/86842 A2 | | 11/2001 |

OTHER PUBLICATIONS

PR Newswire. New York: Oct. 3, 2000. p. 1, "Succeeding Where Napster Failed, GotchPort! Bridges the Gap Between the Interests of Labels and Fans".*
No Author—Internet Business News—May 1, 2002—Brief Article—Internet Business News.

* cited by examiner

*Primary Examiner*—Mark Fadok
*Assistant Examiner*—Mila Airapetian
(74) *Attorney, Agent, or Firm*—Scott Charles Richardson; The Brevetto Law Group, PLLC

(57) ABSTRACT

Digitally encoded content (e.g., music) is provided in a protected mode, along with a player that can unlock and/or decode this music on a user's personal computer (PC) for enjoyment only at their PC. Since the music is in a proprietary, protected form, the user cannot download to players for other formats, e.g., MP3 players, nor can a CD be burned for use external to the PC. If the user decides that they like the content and wants to use it on another playback device, e.g., a MP3 player, or copy it onto a CD-R for use in a standard audio player, the user can initiate a transaction for payment through the player. Once the transaction is completed, the player either converts or transforms the content into a format usable by the, e.g., MP3 player, or converts or transforms the content into wave format and writes it to a CD-R.

33 Claims, 3 Drawing Sheets

MUSIC DISTRIBUTION APPARATUS AND METHOD

BACKGROUND OF THE INVENTION

1. Field of the Invention

The present invention relates to devices, systems, and processes useful for distributing data and/or content, and more specifically to controlling how a user of that data and/or content uses it and can compensate the author or owner.

2. Brief Description of the Related Art

Music sharing has become a very popular activity for many people, and has occasioned the rapid creation and development of formats, devices, and systems that facilitate it. A number of digital music formats, including MP3 and wave formats, have spawned whole industries, and even new vernacular language, to make the use and distribution of digitally encoded music easier, faster, and commercially acceptable. The distribution of such content has been greatly advanced through the use of public networks, e.g., the internet and WWW.

There have been a number of problems that have arisen with the rise of the distribution of digital content, including music, in these new formats and through the internet. Many of the digital formats that are used are not copy-protected, thus opening up the possibility that a single digital copy of a song or set of songs could be distributed without any compensation to the copyright holder. It has been the case that such copying and distribution of digitized copyrighted material has caused economic harm to persons and businesses to whom royalties would have been due for the copies which were distributed in this manner.

Another difficulty in the use of some of these digital formats for music is that a person who wants to preview a song or set of songs typically must pay for a complete copy of the title or titles that they are interested in, effectively defeating the whole notion of previewing them. Instead, the person has, at that time, paid for the title(s) without having made an informed purchasing decision by having first heard the music. Thus, the potential 'buyer' must either pay without having previewed the title(s), or not receive a copy of the title to listen to. Still other prior systems permit the potential buyer only a partial exposure to the content, e.g., a low-fidelity and/or shortened version of a song, low-resolution copy of an image, etc.

Systems have been proposed to address some of the problems associated with the distribution of digitally encoded content, such as music, but are not completely satisfactory for some purposes. For example, U.S. Pat. No. 6,460,076, published International applications WO 01/29732 A2 and WO 01/86842 A2, and published U.S. application Ser. No. US 2002/0062357 A1 all describe various systems and processes of this variety. Subscription services have also been proposed, but are not cost-effective to infrequent users, as they are typically structured so that the user pays a flat fee for access to whole databases of content. The prior art does not, however, provide an acceptable combination of content delivery, protection of encoded content, value to the user, and remuneration to the content source. Indeed, commercial ventures have been launched, such as burnitnow.com, that attempt to address these problems, but fall short of a solution acceptable to both users and content providers.

There therefore remains a need to allow the sharing and distribution of music, whether through the internet or not, while enabling successful content providers, e.g. musicians and labels, to obtain revenue from successful content.

SUMMARY OF THE INVENTION

According to a first aspect of the invention, a method for music distribution to a comprises downloading a content file in a first data format from a remote server to a first user device for a first cost basis; granting a capability to convert said content file to a second data format by paying a second cost basis; and converting said content file to said second data format.

According to another aspect of the present invention, a system useful for distributing content to a system, the system including an audio playback subsystem; wherein the system comprises means for storing encoded content in a first protected format; means for decoding the encoded content for playback directly on the audio playback subsystem; means for conducting a payment transaction with a means for receiving payment; and means for converting the encoded content into a second format.

According to yet another aspect of the present invention, a system useful for distributing content to a, the system including an audio playback subsystem; the system comprises a memory configured to store encoded content in a first protected format; logic configured to decode the encoded content for playback directly on the audio playback subsystem; logic configured to conduct a payment transaction with a payment receiver; and logic configured to convert the encoded content into a second format.

Still other aspects, features, and attendant advantages of the present invention will become apparent to those skilled in the art from a reading of the following detailed description of embodiments constructed in accordance therewith, taken in conjunction with the accompanying drawings.

BRIEF DESCRIPTION OF THE DRAWINGS

The invention of the present application will now be described in more detail with reference to preferred embodiments of the apparatus and method, given only by way of example, and with reference to the accompanying drawings, in which.

DESCRIPTION OF THE PREFERRED EMBODIMENTS

Figure 1:
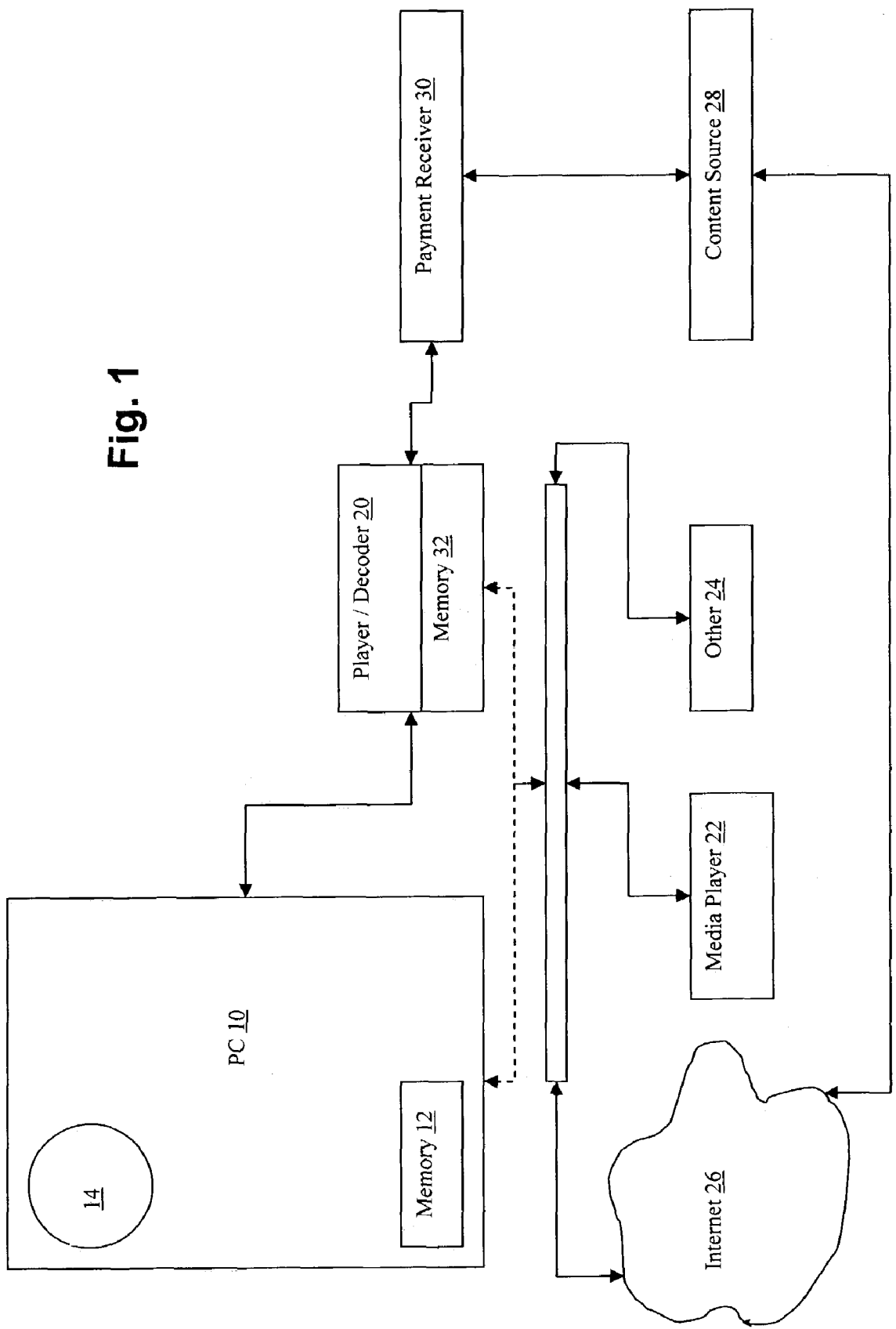
FIG. 1 schematically illustrates an exemplary system in accordance with the present invention.

Referring to the drawing figures, like reference numerals designate identical or corresponding elements throughout the several figures.

In general terms, one aspect of the present invention is providing digitally encoded content (e.g, music, text, graphics, images, etc.) in a protected mode, along with a player that can unlock and/or decode this music on a user's personal computer (PC) for enjoyment only at their PC. Optionally, for payment to the content's owner, the content can be unlocked for enjoyment by the user elsewhere. Since the content is in a proprietary, protected form, the user cannot download to players for other formats, e.g., MP3 players, nor can a CD be burned for use external to the PC unless the user pays an additional fee. If the user decides that they like the content and wants to use it on another playback device, e.g., a MP3 player, or copy it onto a CD-R for use in a standard audio player, the user can initiate a transaction for payment through the player.

Once the transaction is completed, the player either converts or transforms the content into a format usable by the content player, e.g., MP3 player, or converts or transforms the content into another format such as MP3, Microsoft™ Windows™ Media Format, or Wave and writes it to a CD-R. The resulting transformed content may be another protected/proprietary format that is recognized only by the target player, e.g., an MP3 player that also plays MMC ('my-media-content') files, a protected file format that cannot be converted back into MP3, or other similar formats.

One aspect of the present invention is that the artist or copyright holder can distribute the content through a protected means that can be listened to or otherwise used, but in a restricted environment—the PC with a player/decoder of the present invention. If the end-user wants to use the content elsewhere, the end-user can pay an amount, either pre-determined or not, and have the content copied, and optionally transformed, to other media such as those readable by a CD-R, MP3 player, or the like, for future enjoyment in other locations. For other media or content types, analogous players and/or viewers are used.

Turning now to the drawing figures, exemplary embodiments and aspects of the present invention are schematically and diagrammatically illustrated. In FIG. 1, a user's personal computer (PC) 10 includes a memory 12 and an audio playback system 14, e.g., an amplified, a speaker or headphones, and associated circuitry, as well as other subcomponents typically found in PCs (not illustrated). Those of skill in the art are well acquainted with the construction and use of personal computers and their subcomponents, and therefore some details will not be discussed so that aspects of the present invention are not obscured.

A player/decoder 20 according to the present invention is in communication with the PC 10. While the player 20 can be embodied in one of numerous forms, the player 20 includes logic that receives encoded content, decodes that content, and communicates the decoded content to the audio component(s) 14 of the PC 10. In this manner, the player 20 permits the user of the PC 10 to use the digital content that the player has played back through the PC's audio system 14, while restricting the use of the content to use only on a PC equipped with a player of the present invention. As mentioned above and discussed in detail below, the present invention therefore addresses some of the deficiencies in the prior art.

The player 20 can be a physical device attached to, or incorporated into, the PC 10, and for these embodiments can be either controlled through the PC or can include separate controls. As a peripheral device or device integrated into a PC 10, the player 20 can have a memory 32 itself, or can use the memory 12 of the PC. Alternatively, the player 20 can be a virtual machine, e.g., a set or sets of computer executable instructions which, when operated on by a PC, performs the functions described herein, including conversion or transformation of content data from a source form into a form that can be played back through the PC's speaker(s). The computer executable instructions can be scripted in any source code, and specifically includes being scripted in a platform-independent language that is executable through a web-browser application such as Microsoft™ Internet Explorer™, Netscape™ Communicator™, AOL™, and the like.

The player 20 can optionally include or be in communication with a memory media drive or player 22 which itself can receive media on which encoded content is stored, such as a CD including encoded content or the like. Optionally, the player can include an input/output port (e.g., a USB, FireWire™, or other similar device) and associated circuitry and controllers, to which another device 24 can be connected and from which the encoded content can be transmitted to the player 20; one non-limiting example of such a device 24 is a semiconductor memory device (not illustrated), such as a 'memory stick', in which the encoded content is stored, and which can be inserted into a USB port of the player. Further optionally, the player 20 can be in communication with a network, such as the internet 26, through which the player 20 can communicate with a content source or server 28 and receive content in several forms. The content source 28 can be, for example, a content clearinghouse for multiple business entities or for a single business entity.

As suggested by the broken lines in FIG. 1, the player 20 can be in direct communication with the media player 22, other source 24, and/or internet 26. Additionally or alternatively, the PC 10 can be in communication with the media player 22, other source 24, and/or internet 26, and the player 20 communicates with these content sources through the PC. As will be readily appreciated by those of skill in the art, any one or more of the player 20, the media source 22, and the other sources 24 can be incorporated into or as a peripheral device of the PC 10.

Another optional aspect of the present invention is that the player 20 includes a cryptographic key, serial number, and/or other unique identifier such that the second data format can be 'encoded' with one or more of these unique keys, etc., and, once encoded, can only be player back on the player with that particular key or set of unique identifiers. In this manner, once the user has paid for a license to the content, the user can enjoy the content only through the player 20. Further optionally, the player 20 equipped with these unique identifiers and the logic to decode content that has been encoded with them also preferably is also configured to play back unencoded content, e.g., MP3 and/or Wave files.

Figure 2:
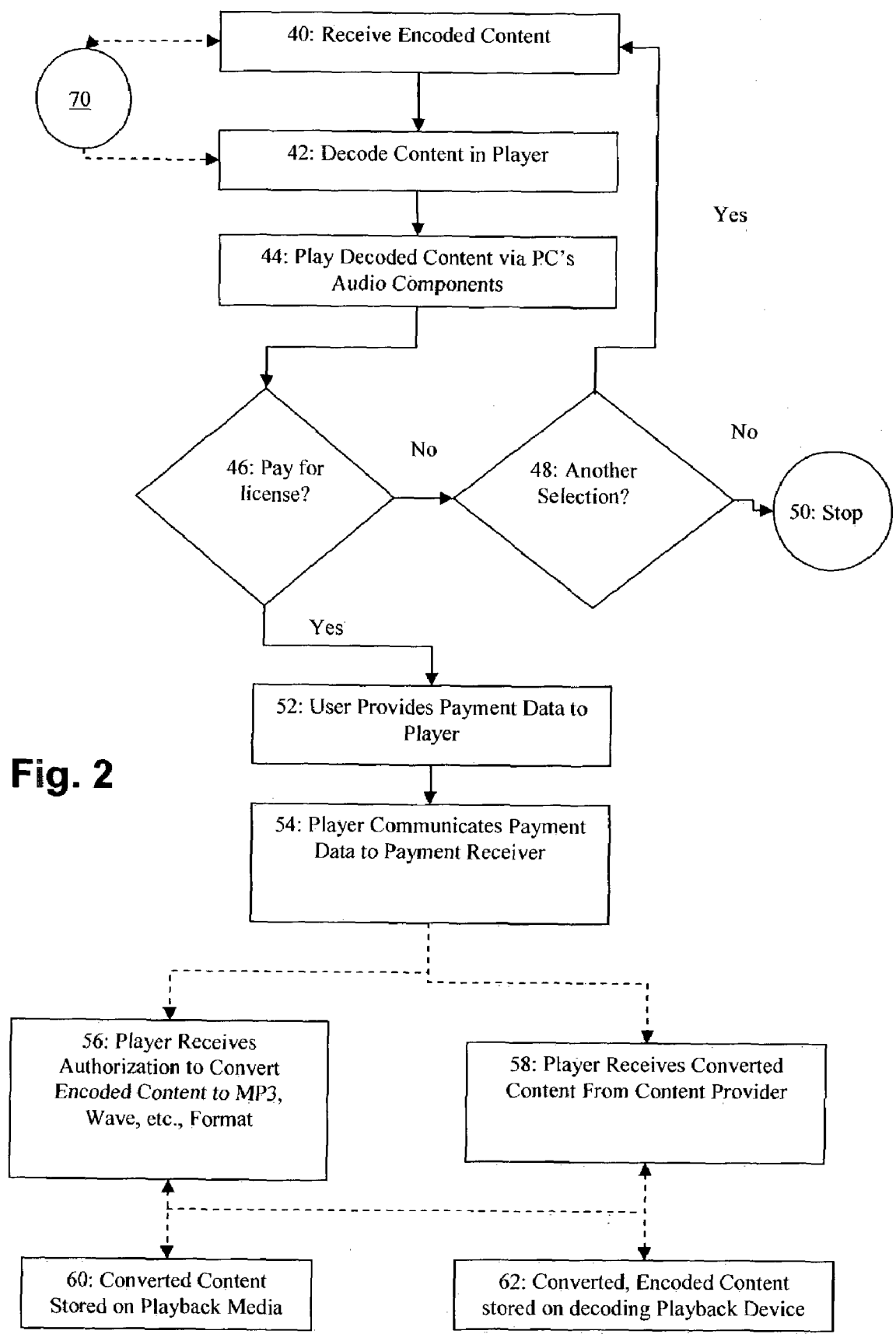
FIG. 2 diagrammatically illustrates a flowchart relating to an aspect of the present invention.

Turning now to FIG. 2, the use of the exemplary embodiment illustrated in FIG. 1 will be explained, as well as exemplary embodiments of methods in accordance with the present invention. Encoded content is received (40) and is decoded (42) by the player 20. Optionally, a payment transaction 70 is completed (see FIG. 3, and below). As discussed above, the content can be received from one or more of numerous sources. Optionally, the user will be obligated to pay some base, first fee for the opportunity to preview the content; this base fee may be zero, or may be some non-zero amount, and is transacted via the payment receiver as described below. The decoded content is then played back (44) directly through the audio system 14 of the PC 10, and the user of the player 20 and the PC 10 is given the opportunity to make a decision (46) about purchasing a license to the content (e.g., a song). The decoded content is in a form or format at this point that is not suitable for playback by a CD player, MP3 player, or the like, which greatly limits the possibility that the content would be copied and distributed at this stage.

If the user decides to purchase a license, the user provides payment information (52) to the player 20, either through input device(s) (not illustrated) associated with the player itself, or through the PC 10. The player 20 then communicates (54) the payment data to a payment receiver 30 (see FIG. 1), which processing the payment of a second fee, which is preferably, although not necessarily, greater than the base fee. Of course, if the user decides not to purchase a license to the particular content that has been previewed, the player 20 can optionally provide the user the opportunity to make another selection (48) of other content to preview. If the user decides to preview other content, the process cycles back to receiving content (40); if the user decides not to preview additional content at that time, the process stops (50).

As suggested by the broken lines in FIG. 2, after the payment receiver processes the payment, converted content is made available to the user via the player 20. According to one exemplary embodiment, the player 20 receives authorization (56) from the payment receiver 30, or the content source 28, to convert the encoded content into a format that the user can play back using another type of device, e.g., the content can be converted into a MP3 or wave format, and this converted content can then be stored (60) from the PC 10 to a suitable MP3 or wave player memory media. Alternatively, the player 20 receives converted content (58) from the content source, and can be stored on a suitable MP3 or wave player memory media. As will be readily appreciated by those of skill in the art, once the content is converted from the encoded format, the converted format of the content (e.g., Microsoft™ Windows™ Media Format, MP3, wave, etc.) can be stored in the memory of the PC 10 for later transfer to the MP3 memory media or the like. Alternatively, the encoded content can be stored in memory (PC or player) for later conversion by the player 20 and storage.

As discussed above, one optional aspect of the present invention is that the player 20 includes logic configured to utilize a unique identifier, e.g., cryptographic key or serial number, by which encoded content can be decoded. That is, as indicated in FIG. 2, after the user has paid for a license for the content, content loaded into the player is encoded with the unique identifier carried by the logic of the player 20. Thereafter, only the player 20 can decode the uniquely encoded content for playback. Of course, the player 20 preferably also includes logic to play back content that is not uniquely encoded, e.g., MP3 and Wave files.

Furthermore, the content source 28 can be the same business entity as the payment receiver, or they can be different business entities. For example, the payment receiver 30 can be a credit card processor that processes payments for a publishing house 28 or the like; alternatively, the content source and payment receiver can be different computer subsystems or departments within the same business entity.

Figure 3:
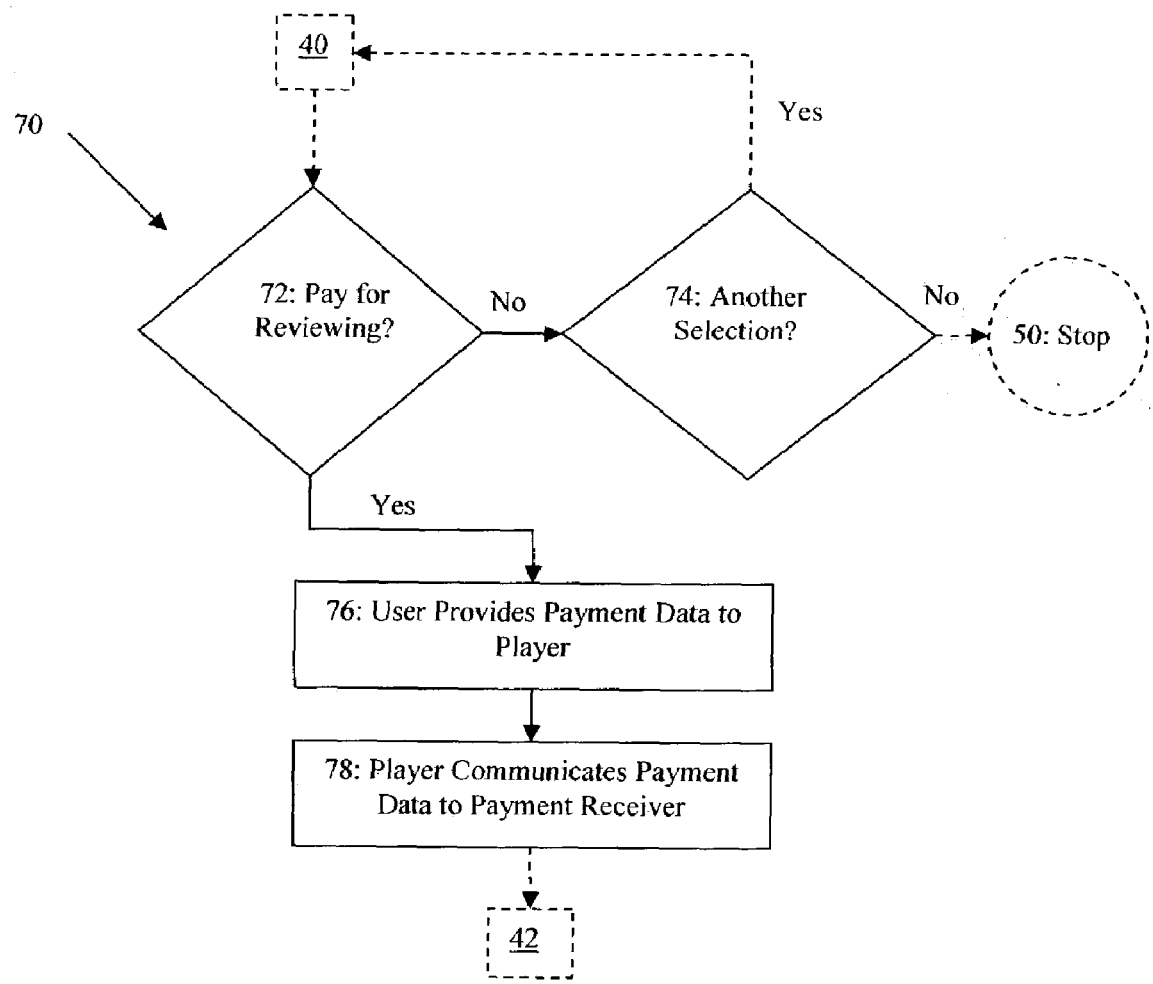
FIG. 3 diagrammatically illustrates a flowchart relating to another aspect of the present invention.

Turning now to FIG. 3, another optional aspect of the present invention is illustrated. In the embodiment diagrammatically illustrated in the drawing figure, after the user receives encoded content (40), a payment transaction process is performed in a manner very similar to that described above with reference to FIG. 2. Specifically, the user of the player 20 and the PC 10 is given the opportunity to make a decision (72) about paying for the opportunity to review or preview the content (e.g., a song). Of course, the level of payment could be any level, including a free review.

If the user decides to preview the content, the user provides payment information (76) to the player 20, either through input device(s) (not illustrated) associated with the player itself, or through the PC 10. The player 20 then communicates (78) the payment data to a payment receiver 30 (see FIG. 1), which processing the payment of the fee. Of course, if the user decides not to pay the fee to preview the particular content that has been previewed, the player 20 can optionally provide the user the opportunity to make another selection (74) of other content to preview. If the user decides to preview other content, the process cycles back to receiving content (40); if the user decides not to preview additional content at that time, the process stops (50). If the user decides to preview the particular content, then the content is decoded (42).

Another aspect of the present invention is that the format in which the content is encoded, and therefore protected from unauthorized playback, can be any of numerous formats. By way of example and not of limitation, the encoding can be or include a form of encryption. Encryption algorithms are well known to those of skill in the art, as well as being readily commercially available, and a familiarity with such algorithms is well within the abilities of the skilled artisan. Other encoding, such as a specialized file format, data compression, and/or password protection, are also within the scope of the present invention.

While numerous combinations of the subcomponents of a system, and steps of a method, in accordance with the present invention are described above, one particularly preferred embodiment of a system includes a player 20 which is physically separate from the PC 10, and is connected to and in communication with the PC and the internet. The player 20 includes a memory 32 for storing the encoded content data, decoded content data, and converted content data, and communicates via the internet with the payment receiver 30 and the content source 28. A memory drive associated with the PC is optionally used for creating a copy of the converted content for later playback, e.g. a CD-R burner (not illustrated) for writing a CD including a converted wave file, and/or an MP3 player in communication with the PC is used for storage of MP3-format converted content.

Another aspect of the present invention is a method of distributing content, in particular music, in a protected format. As described above, the content source 28, which can be the same or a different business entity as the payment receiver, distributes content in an encoded format to the player 20. Once the user has finalized a payment transaction with the payment receiver 30 for a license to a copy of the content, the content source 28 permits the user to have a license to use one (or potentially more) copies of the content. As described above, the content source 28 can directly supply the content in the format that the user wants (MP3, etc.), or the content source can instruct the player 20 to convert the encoded content into the appropriate format for the user. Thus, the content source 28 can control the distribution of copies of the content in exchange for compensation from the user, and the user is provided with a good opportunity to review the content before making a buying decision.

Some, but not all, of the aspects of the present invention are that the user can preview the potentially desired content in full, e.g. for music, in full fidelity, and not merely a portion of the content, or at attenuated audio fidelity. Of course, the present invention also includes the aspect that the content source provides less than a full copy of the content for preview by the user, but this is less preferable. Furthermore, infrequent users of the system are not penalized in the manner of subscription services for underutilizing the subscription. The copyright holders of protected content have the option of managing the distribution of their works in a manner that can provide a fair balance between the desires of the user to preview the work, and the desires of the copyright holder to prevent unauthorized distribution and copying of the work, and receiving compensation for licenses to the work.

While the invention has been described in detail with reference to preferred embodiments thereof, it will be apparent to one skilled in the art that various changes can be made, and equivalents employed, without departing from the scope of the invention. Each of the aforementioned documents is incorporated by reference herein in its entirety.

What is claimed is:

1. A method for music distribution to a user comprising:
   downloading a content file in a proprietary first data format from a remote server of a content source to a first user device for preview at a first cost basis, said content file including at least one entire song in full fidelity;

providing a player associated with the content source suitable for decoding said content file encoded in the first data format;

granting a capability to convert said content file to a second data format by paying a second cost basis; and converting said content file to said second data format.

2. A method in accordance with claim 1, wherein the first cost basis is free.

3. A method in accordance with claim 1, wherein the first data format of the content file is different than the data format of the second data format.

4. A method in accordance with claim 1, wherein the second data format is selected from the group consisting of an audio wave and an MP3.

5. A method in accordance with claim 1, wherein the first data format of the content file is not suitable for playback on a device selected from the group consisting of an audio CD player and an MP3 player.

6. A method in accordance with claim 1, wherein the second data format of the content file is encoded for playback on a player equipped to decode the content file.

7. A method in accordance with claim 6, wherein the second data format of the content file is encoded in a manner suitable for playback on only one audio player.

8. A system useful for distributing content to a system, the system including an audio playback subsystem; the system comprising:

means for storing encoded content from a content source, said encoded content including at least one entire song in full fidelity encoded for preview in a first protected format associated with the content source;

means for decoding the encoded content for playback directly on the audio playback subsystem, said means for decoding also being associated with the content source;

means for conducting a payment transaction with a means for receiving payment;

and means for converting the encoded content into a second format.

9. A system in accordance with claim 8, wherein the second format comprises an unprotected format suitable for playback.

10. A system in accordance with claim 8, wherein the means for conducting a payment transaction further comprises means for conducting first and second payment transactions, the first payment transaction enabling the means for decoding to decode the encoded content for playback directly on the system's audio playback system.

11. A system in accordance with claim 8, wherein the second payment transaction enables the means for converting to convert the encoded content into an unprotected format suitable for playback.

12. A system in accordance with claim 8, further comprising a means for receiving payment in communication with the means for conducting a payment transaction.

13. A system in accordance with claim 8, wherein the content source is in communication with the means for storing encoded content.

14. A system in accordance with claim 8, wherein the first protected format is not suitable for playback directly on the system's audio playback subsystem.

15. A system in accordance with claim 8, wherein the first protected format is not suitable for playback on an audio CD player or on an MP3 player.

16. A system in accordance with claim 8, wherein the system comprises a PC.

17. A system in accordance with claim 8, wherein the first payment transaction is free.

18. A system in accordance with claim 8, wherein the second format is encoded with a unique identifier such that the second format is suitable for playback only on devices which are equipped with the unique identifier.

19. A system in accordance with claim 18, wherein the unique identifier is selected from the group consisting of a cryptographic key and a serial number.

20. A system useful for distributing content to a system, the system including an audio playback subsystem, the system comprising:

a memory configured to store encoded content from a content source, said encoded content including at least one entire song in full fidelity encoded for preview in a first protected format associated with the content source;

circuitry configured to decode the encoded content for playback directly on the audio playback subsystem, said circuitry configured to decode also being associated with the content source;

circuitry configured to conduct a payment transaction with a payment receiver;

and circuitry configured to convert the encoded content into a second format.

21. A system in accordance with claim 20, wherein the second format comprises an unprotected format suitable for playback.

22. A system in accordance with claim 20, wherein the circuitry configured to conduct a payment transaction further comprises circuitry configured to conduct first and second payment transactions, the first payment transaction enabling the circuitry configured to decode to decode the encoded content for playback directly on the system's audio playback system.

23. A system in accordance with claim 20, wherein the second payment transaction enables the circuitry configured to convert to convert the encoded content into an unprotected format suitable for playback.

24. A system in accordance with claim 20, further comprising: a payment receiver in communication with the circuitry configured to conduct a payment transaction.

25. A system in accordance with claim 20, wherein the content source is in communication with the memory configured for storing encoded content.

26. A system in accordance with claim 20, wherein the first protected format is not suitable for playback directly on the system's audio playback subsystem.

27. A system in accordance with claim 20, wherein the first protected format is not suitable for playback on an audio CD player or on an MP3 player.

28. A system in accordance with claim 20, wherein the system comprises a PC.

29. A system in accordance with claim 20, wherein the first payment transaction is free.

30. A system in accordance with claim 20, wherein the second format is encoded with a unique identifier such that the second format is suitable for playback only on devices which are equipped with the unique identifier.

31. A system in accordance with claim 30, wherein the unique identifier is selected from the group consisting of a cryptographic key and a serial number.

32. A method in accordance with claim 1, wherein the first data format of the content file is encoded in a manner suitable for playback on said first device; and wherein the second data format of the content file is encoded in a manner suitable for playback on one or more devices other than the first user device.

33. A system in accordance with claim 8, wherein the first protected format of the encoded content is suitable for playback on said audio playback subsystem; and wherein the second format of the encoded content is suitable for playback on one or more devices other than said audio playback subsystem.

* * * * *